US011953380B2

(12) United States Patent
Foughi et al.

(10) Patent No.: US 11,953,380 B2
(45) Date of Patent: Apr. 9, 2024

(54) COMBINED NEAR AND MID INFRARED SENSOR IN A CHIP SCALE PACKAGE

(71) Applicant: NEXTINPUT, INC., Mountain View, CA (US)

(72) Inventors: Ali Foughi, Atherton, CA (US); Julius Minglin Tsai, San Jose, CA (US); Christopher Edwards, Sunnyvale, CA (US)

(73) Assignee: NextInput, Inc., Mountain View, CA (US)

( * ) Notice: Subject to any disclaimer, the term of this patent is extended or adjusted under 35 U.S.C. 154(b) by 0 days.

(21) Appl. No.: 17/613,222

(22) PCT Filed: May 21, 2020

(86) PCT No.: PCT/US2020/033978
§ 371 (c)(1),
(2) Date: Nov. 22, 2021

(87) PCT Pub. No.: WO2020/237039
PCT Pub. Date: Nov. 26, 2020

(65) Prior Publication Data
US 2022/0214223 A1 Jul. 7, 2022

Related U.S. Application Data

(60) Provisional application No. 62/850,795, filed on May 21, 2019.

(51) Int. Cl.
*G01J 5/20* (2006.01)
*G01J 5/00* (2022.01)
(Continued)

(52) U.S. Cl.
CPC ............... *G01J 5/20* (2013.01); *G01J 5/0007* (2013.01); *G01J 5/024* (2013.01); *G01J 5/58* (2013.01)

(58) Field of Classification Search
CPC .. G01J 5/20; G01J 5/0007; G01J 5/024; G01J 5/58; G01J 5/0853
See application file for complete search history.

(56) References Cited

U.S. PATENT DOCUMENTS

| 2,788,381 A | 4/1957 | Baldwin |
| 2,994,053 A | 7/1961 | De Waard |

(Continued)

FOREIGN PATENT DOCUMENTS

| JP | 06-137938 A | 5/1994 |
| JP | 08-94398 A | 4/1996 |

(Continued)

OTHER PUBLICATIONS

PCT Application No. PCT/US2020/033978, International Search Report and Written Opinion, dated Aug. 17, 2020, 10 pgs.
(Continued)

*Primary Examiner* — Christine S. Kim
(74) *Attorney, Agent, or Firm* — Withrow & Terranova, P.L.L.C.

(57) ABSTRACT

Described herein is a sensor in chip scale package form factor. For example, a non-vacuum packaged sensor chip described herein includes a substrate, and a sensing element arranged on the substrate. The sensing element is configured to change resistance with temperature. Additionally, the non-vacuum packaged sensor chip includes an absorbing layer configured to absorb middle infrared ("MIR") radiation.

25 Claims, 7 Drawing Sheets

(51) Int. Cl.
*G01J 5/02* (2022.01)
*G01J 5/58* (2022.01)

(56) References Cited

U.S. PATENT DOCUMENTS

| | | | |
|---|---|---|---|
| 3,109,097 A | 10/1963 | De Waard et al. | |
| 4,139,833 A | 2/1979 | Kirsch | |
| 4,224,520 A | 9/1980 | Greene et al. | |
| 4,574,263 A | 3/1986 | Liddiard | |
| 5,302,933 A | 4/1994 | Kudo et al. | |
| 5,404,125 A | 4/1995 | Mori et al. | |
| 5,798,684 A | 8/1998 | Endo et al. | |
| 5,808,350 A * | 9/1998 | Jack | H10N 15/10 257/E27.138 |
| 6,034,374 A | 3/2000 | Kimura et al. | |
| 6,339,187 B1 | 1/2002 | Inoue | |
| 7,718,965 B1 | 5/2010 | Syllaios et al. | |
| 9,472,547 B2 * | 10/2016 | Tsumura | G01K 7/01 |
| 2009/0152467 A1 | 6/2009 | Cheon et al. | |
| 2009/0212385 A1 | 8/2009 | Ohkubo et al. | |
| 2010/0133536 A1 | 6/2010 | Syllaios et al. | |
| 2011/0175145 A1 * | 7/2011 | Tsuji | G01J 5/20 257/470 |
| 2014/0346356 A1 | 11/2014 | Thales et al. | |
| 2015/0176947 A1 | 6/2015 | Zaitsev | |
| 2017/0219434 A1 | 8/2017 | Udrea et al. | |
| 2020/0232853 A1 * | 7/2020 | Nam | G01J 5/064 |

FOREIGN PATENT DOCUMENTS

| | | |
|---|---|---|
| JP | 2006343229 A | 12/2006 |
| WO | 9905723 A1 | 2/1999 |

OTHER PUBLICATIONS

Dehui Xu et al., "MEMS-based thermoelectric infrared sensors: A review," Front. Mech. Eng. 2017, 12(4): 557-566.
Allan Hilton et al., "Wafer-Level Vacuum Packaging of Smart Sensors," Sensors 2016, 16, 1819; doi: 10.3390/s16111819.
Partial Supplementary European Search Report for European Patent Application No. 20809514.1, dated Jun. 26, 2023, 13 pages.
Kolfman, V. et al., "Hamamatsu Enhances IR Sensitivity by MEMS Structures," Image Sensors World, Dec. 16, 2010, available from the Internet: [URL: https://image-sensors-world.blogspot.com/2010/12/hamamatsu-enhances-ir-sensitivity-by. Html], 7 pages.
Extended European Search Report for European Patent Application No. 20809514.1, dated Nov. 22, 2023, 16 pages.

* cited by examiner

COMBINED NEAR AND MID INFRARED SENSOR IN A CHIP SCALE PACKAGE

CROSS-REFERENCE TO RELATED APPLICATIONS

This application claims the benefit of U.S. provisional patent application No. 62/850,795, filed on May 21, 2019, and entitled "COMBINED NEAR AND MID INFRARED SENSOR IN A CHIP SCALE PACKAGE," the disclosure of which is expressly incorporated herein by reference in its entirety.

FIELD OF TECHNOLOGY

The present disclosure relates to an infrared ("IR") sensor. The sensor comes in a non-vacuum packaged chip scale package form factor. In some implementations, the sensor is capable of detecting both near IR ("NIR") and middle IR ("MIR") simultaneously. The sensor is able to separate the response from NIR and MIR with electrical tuning.

BACKGROUND

NIR and MIR sensing have many applications individually. In NIR, it is used for proximity sensing, night vision or 3D mapping, while MIR is widely used for room occupancy, remote temperature sensing and thermal imaging. Typically, NIR and MIR sensors are made separately and a special vacuum package is required for MIR especially. Many MEMS sensors, including infrared sensors, require a vacuum environment to achieve the desired sensitivity. A vacuum environment can be established after fabrication of the sensor element(s), which protects the sensor element(s) during further processing. For example, component-level and wafer-level vacuum packaging processes are known in the art. Such processes are used to bond a lid (e.g., passive wafer) to the sensor die, sealing the sensor element(s) in a vacuum package. There is no existing technology that combines both MIR and NIR functions and that also removes the vacuum package requirement.

SUMMARY

The present disclosure pertains a sensor in chip scale package form factor that senses NIR and/or MIR. An example non-vacuum packaged sensor chip is described herein. The non-vacuum packaged sensor chip includes a substrate, and a sensing element arranged on the substrate. The sensing element is configured to change resistance with temperature. Additionally, the non-vacuum packaged sensor chip includes an absorbing layer configured to absorb middle infrared ("MIR") radiation.

Additionally, the sensing element is formed of a p-type semiconductor material.

In some implementations, the substrate is an n-type semiconductor substrate. In other implementations, the substrate is a p-type semiconductor substrate having an n-type well, and the sensing element is arranged in the n-type well. In yet other implementations, the substrate is a CMOS substrate.

Alternatively or additionally, the substrate defines a top surface and a bottom surface. In some implementations, the non-vacuum packaged sensor chip includes a dielectric layer arranged on the bottom surface. Optionally, the absorbing layer is arranged on the dielectric layer. Alternatively, the absorbing layer is arranged on the top surface.

Alternatively or additionally, the non-vacuum packaged sensor chip includes a plurality of terminals configured to measure a resistance of the sensing element.

Alternatively or additionally, the non-vacuum packaged sensor chip includes a plurality of photo-current terminals configured to measure a current induced by near infrared ("NIR") radiation. For example, NIR radiation has a wavelength between about 900 nm and 1 µm.

Alternatively or additionally, the absorbing layer is configured to absorb a wavelength between about 1 µm and about 20 µm.

Alternatively or additionally, the absorbing layer is formed of silicon nitride, metal, or polymer.

Alternatively or additionally, the non-vacuum packaged sensor chip has a chip scale package form factor.

An example sensor system is also described herein. The sensor system includes the non-vacuum packaged sensor chip described herein, and an external circuit substrate, where the non-vacuum packaged sensor chip is electrically and mechanically coupled to the external circuit substrate via solder bumps or pillars. Optionally, the external circuit substrate is a printed circuit board.

Another example sensor chip is described herein. The sensor chip includes a substrate, and a sensing element arranged on the substrate. The sensing element is configured to change resistance with temperature. Additionally, the sensor chip includes an absorbing layer configured to absorb middle infrared ("MIR") radiation. The sensor chip further includes a plurality of terminals configured to measure a resistance of the sensing element, and a plurality of photo-current terminals configured to measure a current induced by near infrared ("NIR") radiation.

Additionally, the sensing element is formed of a p-type semiconductor material.

In some implementations, the substrate is an n-type semiconductor substrate. In other implementations, the substrate is a p-type semiconductor substrate having an n-type well, and the sensing element is arranged in the n-type well. In yet other implementations, the substrate is a CMOS substrate.

Alternatively or additionally, the substrate defines a top surface and a bottom surface. In some implementations, the sensor chip includes a dielectric layer arranged on the bottom surface. Optionally, the absorbing layer is arranged on the dielectric layer. Alternatively, the absorbing layer is arranged on the top surface.

Alternatively or additionally, NIR radiation has a wavelength between about 900 nm and 1 µm.

Alternatively or additionally, the absorbing layer is configured to absorb a wavelength between about 1 µm and about 20 µm.

Alternatively or additionally, the absorbing layer is formed of silicon nitride, metal, or polymer.

Alternatively or additionally, the sensor chip has a chip scale package form factor.

Another example sensor system is also described herein. The sensor system includes the sensor chip described herein, and an external circuit substrate, where the sensor chip is electrically and mechanically coupled to the external circuit substrate via solder bumps or pillars. Optionally, the external circuit substrate is a printed circuit board.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE FIGURES

The components in the drawings are not necessarily to scale relative to each other. Like reference numerals designate corresponding parts throughout the several views. These and other features will become more apparent in the detailed description in which reference is made to the appended drawings wherein.

DETAILED DESCRIPTION

Figure 1:
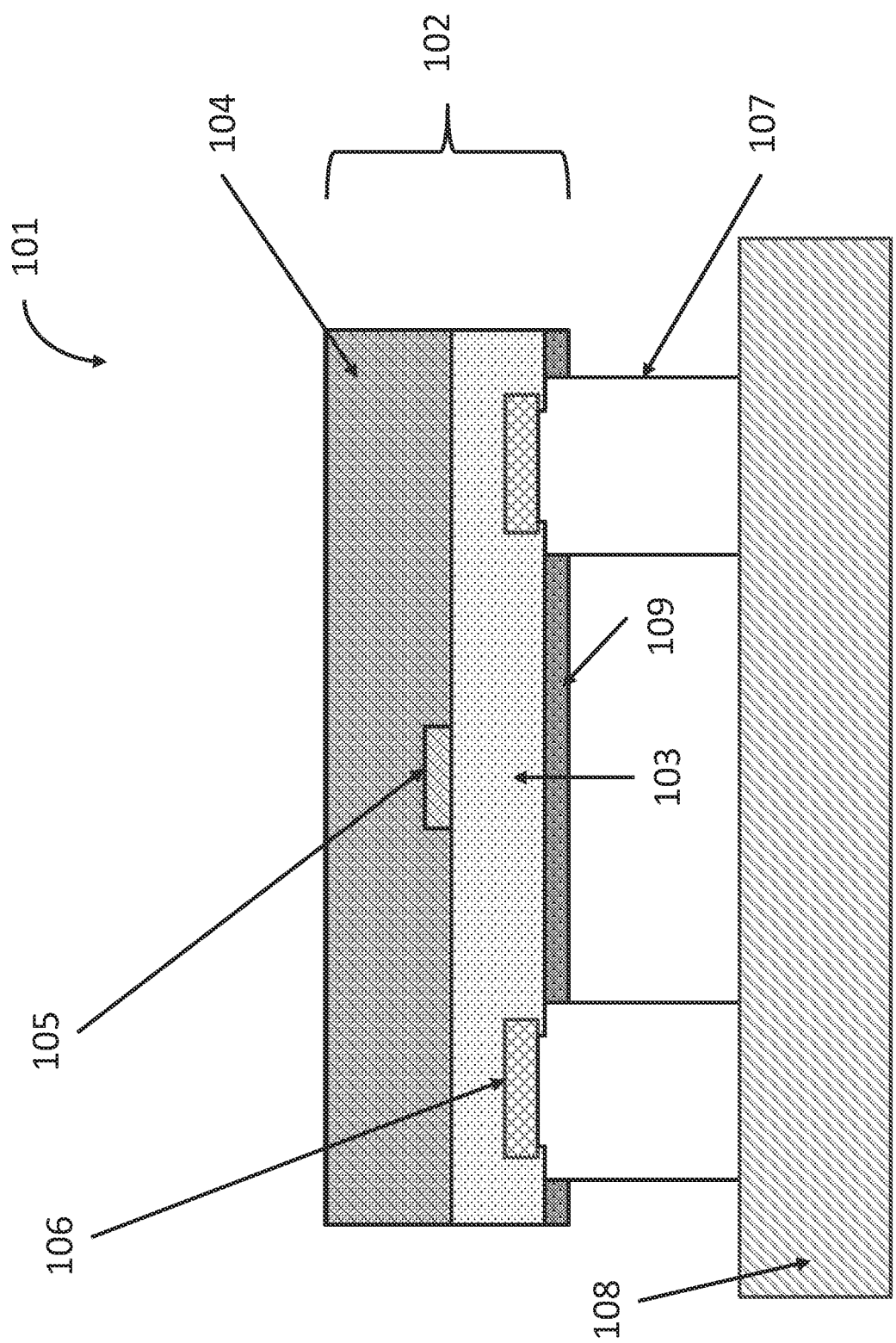
FIG. 1 illustrates an IR sensor system with n-type silicon substrate and MIR absorption layer at a bottom surface of the sensor.

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances, and are contemplated by this disclosure. Thus, the following description is provided as illustrative of the principles and not in limitation thereof.

As used throughout, the singular forms "a," "an" and "the" include plural referents unless the context clearly dictates otherwise. Thus, for example, reference to "a sensing element" can include two or more such sensor sensing elements unless the context indicates otherwise.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "about" or "approximately", when used in reference to a wavelength, mean within plus or minus 20 percentage of the referenced wavelength. As used herein, NIR has a wavelength from about 900 nanometer ("nm") to about 1 micrometer ("µm"), and MIR has a wavelength from about 1 µm to about 20 µm. As used herein, the terms "about" or "approximately", when used in reference to dimensions of a chip scale package ("CSP"), mean within plus or minus 50 percentage of the referenced dimension. As used herein, chip scale package form factor is from about 1 millimeter ("mm") to about 5 mm.

As used herein, the terms "optional" or "optionally" mean that the subsequently described event or circumstance may or may not occur, and that the description includes instances where said event or circumstance occurs and instances where it does not.

The present disclosure relates to a non-vacuum packaged sensor chip (e.g., any one of sensor chips shown in FIGS. 1-4) in chip scale package form factor in some implementations. The non-vacuum packaged sensor chip is configured to detect MIR. Optionally, the non-vacuum packaged sensor chip is also configured to detect NIR simultaneously with MIR. The present disclosure also related to a combined NIR and MIR sensor chip (e.g., any one of sensor chips shown in FIGS. 5 and 6) in chip scale package form factor, which does not require vacuum packaging.

FIG. 1 illustrates an IR sensor system 101 according to an implementation described herein. The sensor system 101 includes a non-vacuum packaged sensor chip. In some implementations, a non-vacuum packaged sensor chip is configured to detect MIR. Optionally, the non-vacuum packaged sensor chip is also configured to detect NIR simultaneously with MIR. The sensor system 101 includes a sensor chip 102 that includes a substrate 104, a sensing element 105, and an absorbing layer 109 that is configured to absorb MIR radiation. As described herein, MIR has a wavelength from about 1 µm to about 20 µm. The sensing element 105 is configured to change resistance with temperature. Accordingly, MIR radiation is absorbed by the absorbing layer 109 and converted into thermal energy, which causes a temperature change in the sensor chip 102 that can be detected by measuring the resistance of the sensing element 105. Additionally, NIR can be detected by measuring the photo-induced current in the sensor chip 102. As described herein, NIR has a wavelength from about 900 nm to about 1 µm. MIR detection, which induces the change in sensing element 105 resistance, can therefore be separated from NIR detection, which induces the change in photo current. Moreover, as described herein, the sensor chip 102 is a non-vacuum packaged sensor chip. In other words, the sensing element 102 is not vacuum sealed during manufacture. For example, as shown in the figures below, the sensing element(s) are not arranged within a hermetically sealed cavity or void. Instead, the sensing element(s) are formed (e.g., implanted, diffused, etc.) on a surface of the substrate 105, and the substrate 105 is not thereafter vacuum packaged during downstream processing. The sensor chip 102, which is not vacuum packaged, is mounted to an external circuit via electrical connectors (e.g., solder bumps, pillars, etc.) as shown in the figures. In addition, the sensor chip 102 has a chip scale package form factor, for example, about 1-5 mm as described herein.

As shown in FIG. 1, the sensor chip 102 is implemented on a n-type silicon substrate 104. Although silicon (Si) is provided as an example material, this disclosure contemplates using a substrate formed of other n-type semiconductors including, but not limited to, gallium arsenide (GaAs). The sensor chip 102 in FIG. 1 defines a top surface and a bottom surface, which is opposite to the top surface. The sensor chip 102 has a dielectric layer 103 (e.g., silicon dioxide) and a conductive layer 106 (e.g., metal) for electrical routing. It should be understood that the number and arrangement of the dielectric layer 103 and the conductive layer 106 are provided only as examples. The sensor chip 102 can include more than one dielectric layer 103 and/or more than one conductive layer 106. The dielectric layer(s) 103 and conductive layer(s) 106 can be provided to route electrical signal(s), for example, to facilitate measuring resistance of the sensing element and/or measuring photoinduced current (see FIGS. 5 and 6). Additionally, the sensor chip 102 includes a p-type doped sensing element 105. In some implementations, the sensor chip 102 includes a single sensing element 105. In other implementations, the sensor chip 102 includes a plurality of sensing elements 105. The resistance of the sensing element 105 is temperature dependent, i.e., resistance changes as a function of temperature. The sensing element 105 is formed on the n-type silicon substrate 104 through implant or diffusion.

As discussed above, the sensor chip 102 also includes the absorbing layer 109 that is disposed on an external surface of the sensor chip 102 for IR absorption. Although a single absorbing layer 109 is shown as an example, this disclosure contemplates that the sensor chip 102 can include more than one absorbing layer 109. In FIG. 1, the absorbing layer 109 is disposed on the dielectric layer 103, which is arranged on the bottom surface of the sensor chip 102. IR radiation is absorbed by the absorbing layer 109 and converted into thermal energy, which causes a temperature change in the sensor chip 102. IR radiation can thus be detected using the sensor chip 102 by measuring the resistance of the sensing element 105. In implementations described herein, the absorbing layer 109 absorbs a wavelength in MIR, for example, wavelength(s) between about 1 μm and about 20 μm. The absorbing layer 109 can be formed of silicon nitride, metal, or polymer.

The sensor chip 102 can optionally include one or more electrical connectors 107. An electrical connector 107 is used, for example, to route electrical signals between the conductive layer 106 and an external circuit. For example, in FIG. 1, the sensor chip 102 is mounted on a printed circuit board 108 through the electrical connectors 107. It should be understood that the number, size, shape and/or arrangement of the electrical connectors 107 in FIG. 1 are provided only as an example. This disclosure contemplates providing sensor chips having different number, sized, shaped and/or arrangement of electrical connectors. Additionally, in some implementations, the electrical connectors 107 are solder bumps. Although solder bumps are provided as an example, this disclosure contemplates using metal pillars (e.g., copper, nickel, or other metal) instead of solder bumps with the implementations described herein. It should be understood that the solder bumps and metal pillars are only provided as examples and that other types of electrical connectors can be used with the implementations described herein. The printed circuit board 108 serves as the heat sink during operation and heat flux will flow through the electrical connectors 107. The sensor chip 102, the electrical connectors 107 and the printed circuit board 108 together form the sensor system 101. Due to the size of the sensor chip 102 in chip scale package (CSP), the heat loss is dominated by heat conduction through electrical connectors 107. The thermal radiation loss and air convection loss, which is typically not forced convection, is low compared with thermal conduction. In a typical case, the sensor chip temperature will rise by about 1/10 of a degree Celsius, and it is sufficient for proper MIR detection. Accordingly, the sensor chip 102 does not require vacuum packaging.

Figure 2:
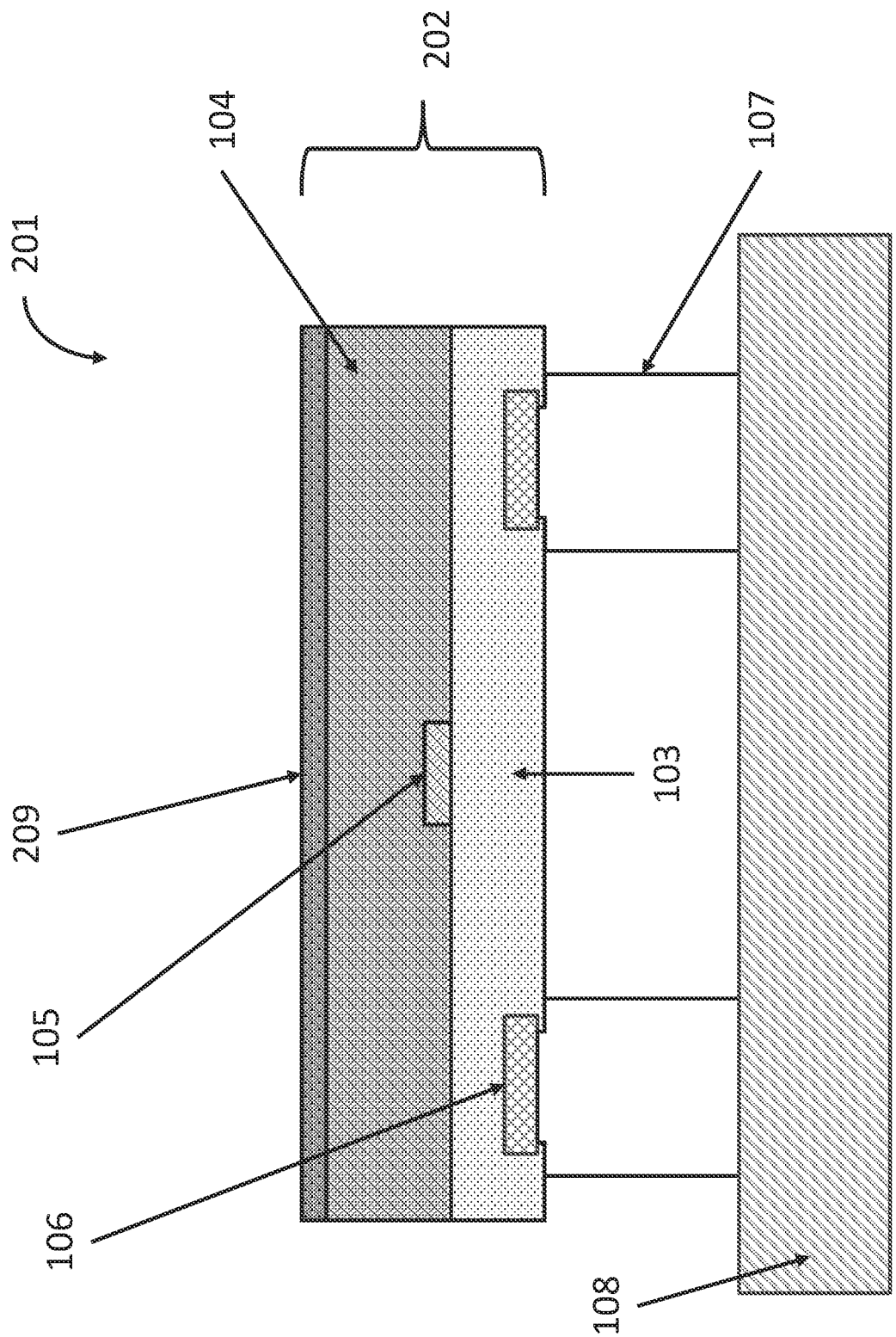
FIG. 2 illustrates an IR sensor system with n-type silicon substrate and MIR absorption layer at a top surface of the sensor.

FIG. 2 illustrates an IR sensor system 201 according to another implementation described herein. The sensor system 201 includes a non-vacuum packaged sensor chip. In some implementations, a non-vacuum packaged sensor chip is configured to detect MIR. Optionally, the non-vacuum packaged sensor chip is also configured to detect NIR simultaneously with MIR. The sensor system 201 includes a sensor chip 202 that includes a substrate 104, a sensing element 105, and an absorbing layer 209 that is configured to absorb MIR radiation. As shown in FIG. 2, the sensor chip 202 is implemented on a n-type silicon substrate 104. The sensor chip 202 in FIG. 2 defines a top surface and a bottom surface, which is opposite to the top surface. The sensor chip 202 also has a dielectric layer 103 and a conductive layer 106 for electrical routing. Dielectric and conductive layers are described in detail above with regard to FIG. 1 and are therefore not described in further detail with regard to FIG. 2. Additionally, the sensor chip 202 includes a p-type doped sensing element 105. The resistance of the sensing element 105 is temperature dependent, i.e., resistance changes as a function of temperature. The sensing element 105 is formed on the n-type silicon substrate 104 through implant or diffusion. Sensing elements are described in detail above with regard to FIG. 1 and are therefore not described in further detail with regard to FIG. 2.

As discussed above, the sensor chip 202 also includes the absorbing layer 209 that is disposed on an external surface of the sensor chip 202 for IR absorption. Although a single absorbing layer 209 is shown as an example, this disclosure contemplates that the sensor chip 202 can include more than one absorbing layer 209. In FIG. 2, the absorbing layer 209 is disposed on the n-type silicon substrate 104, which is the top surface of the sensor chip 202. IR radiation is absorbed by the absorbing layer 209 and converted into thermal energy, which causes a temperature change in the sensor chip 202. IR radiation can thus be detected using the sensor chip 202 by measuring the resistance of the sensing element 105.

The sensor chip 202 can optionally include one or more electrical connectors 107. Electrical connectors (e.g., solder bumps, metal pillars, etc.) are described in detail above with regard to FIG. 1 and are therefore not described in further detail with regard to FIG. 2. The sensor chip 202 is mounted on a printed circuit board 108 through electrical connectors 107. The printed circuit board 108 serves as the heat sink during operation and heat flux will flow through the electrical connectors 107. The sensor chip 202, the electrical connectors 107 and the printed circuit board 108 together form the sensor system 201. In addition, for the same reason described above with regard to FIG. 1, the sensor chip 202 is good for detecting MIR, and the sensor chip 202 does not require vacuum packaging.

Figure 3:
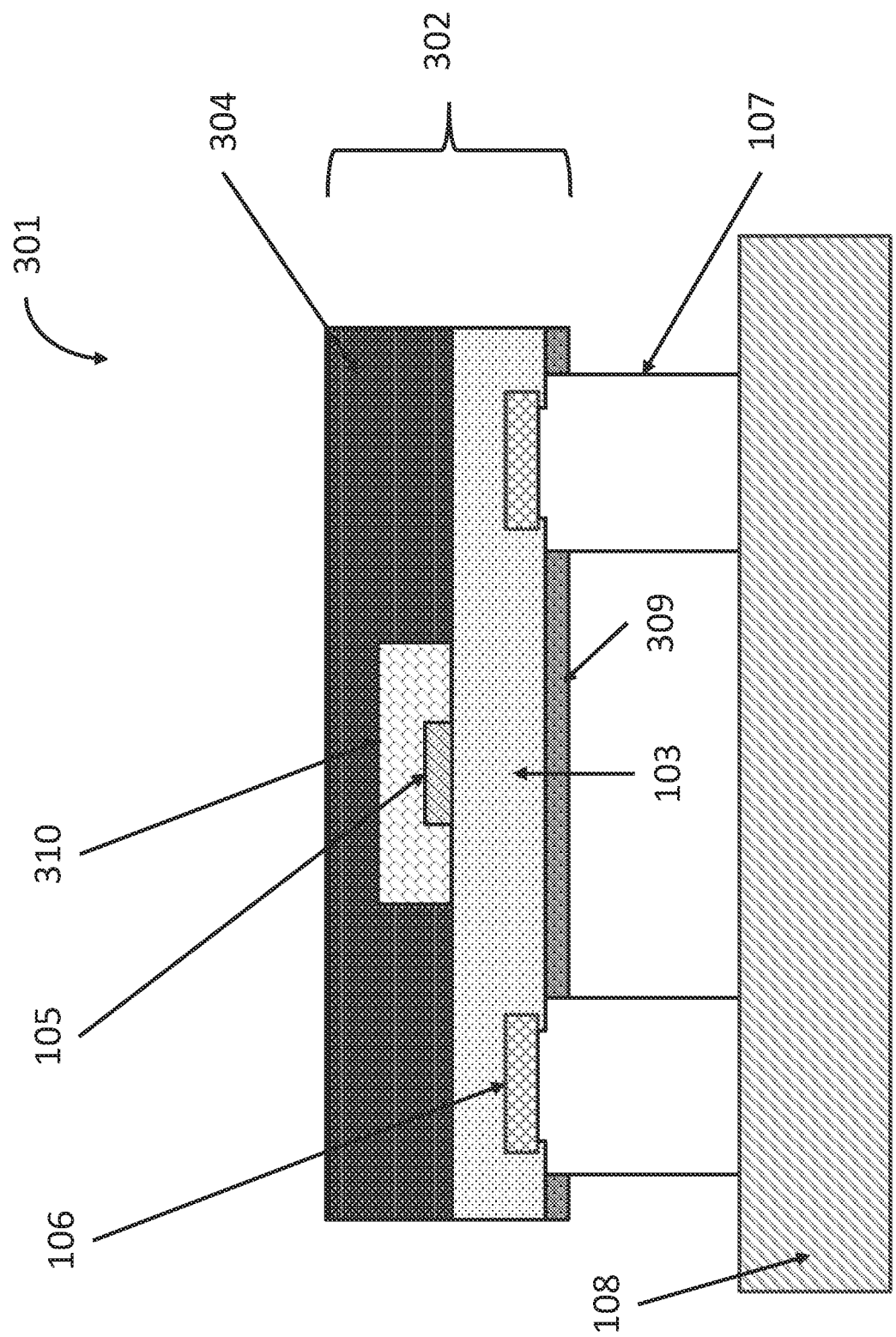
FIG. 3 illustrates an IR sensor system with p-type silicon substrate and MIR absorption layer at a bottom surface of the sensor.

FIG. 3 illustrates an IR sensor system 301 according to another implementation described herein. The sensor system 301 includes a non-vacuum packaged sensor chip. In some implementations, a non-vacuum packaged sensor chip is configured to detect MIR. Optionally, the non-vacuum packaged sensor chip is also configured to detect NIR simultaneously with MIR. The sensor system 301 includes a sensor chip 302 that includes a substrate 304, a sensing element 105, and an absorbing layer 309 that is configured to absorb MIR radiation. As shown in FIG. 3, the sensor chip 302 is implemented on a p-type silicon substrate 304. Although silicon (Si) is provided as an example material, this disclosure contemplates using a substrate formed of other p-type semiconductors including, but not limited to, gallium arsenide (GaAs). The sensor chip 302 in FIG. 3 defines a top surface and a bottom surface, which is opposite to the top surface. The sensor chip 302 also has a dielectric layer 103 and a conductive layer 106 for electrical routing. Dielectric and conductive layers are described in detail above with regard to FIG. 1 and are therefore not described in further detail with regard to FIG. 3. Additionally, the sensor chip 302 includes a p-type doped sensing element 105 and an n-type region or well (referred to herein as "Nwell") 310, which is lightly doped with n-type material. To ensure proper function, the p-type doped sensing element 105 resides in the Nwell 310. In some implementations, the sensor chip 302 includes a single sensing element 105/Nwell 310. In other implementations, the sensor chip 302 includes a plurality of sensing elements 105/Nwells 310. The resistance of the sensing element 105 is temperature dependent, i.e., resistance changes as a function of temperature. The p-type doped sensing element 105 and the Nwell 310 are formed on the p-type silicon substrate 304 through implant or diffusion.

As discussed above, the sensor chip 302 also includes the absorbing layer 309 that is disposed on the external surface of the sensor chip 302 for IR absorption. Although a single absorbing layer 309 is shown as an example, this disclosure contemplates that the sensor chip 302 can include more than one absorbing layer 309. In FIG. 3, the absorbing layer 309 is disposed on the dielectric layer 103, which is arranged on the bottom surface of the sensor chip 302. IR radiation is absorbed by the absorbing layer 309 and converted into thermal energy, which causes a temperature change in the sensor chip 302. IR radiation can thus be detected using the sensor chip 302 by measuring the resistance of the sensing element 105.

The sensor chip 302 can optionally include one or more electrical connectors 107. Electrical connectors (e.g., solder bumps, metal pillars, etc.) are described in detail above with regard to FIG. 1 and are therefore not described in further detail with regard to FIG. 3. The sensor chip 302 is mounted on a printed circuit board 108 through electrical connectors 107. The printed circuit board 108 serves as the heat sink during operation and heat flux will flow through the electrical connectors 107. The sensor chip 302, the electrical connectors 107 and the printed circuit board 108 together form the sensor system 301. In addition, for the same reason described above with regard to FIG. 1, the sensor chip 302 is good for detecting MIR, and the sensor chip 302 does not require vacuum packaging.

Figure 4:
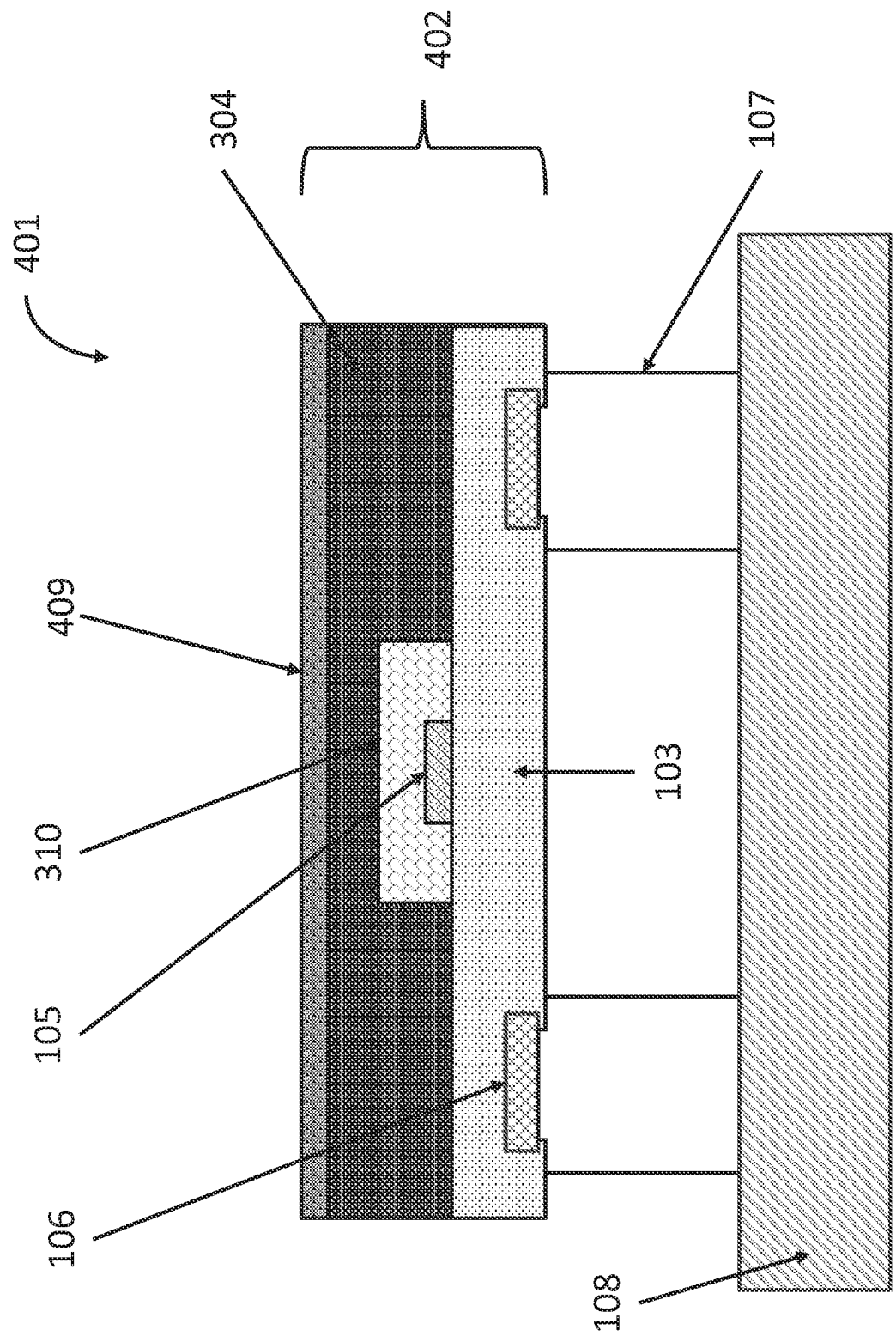
FIG. 4 illustrates an IR sensor system with p-type silicon substrate and MIR absorption layer at a top surface of the sensor.

FIG. 4 illustrates an IR sensor system 401 according to another implementation described herein. The sensor system 401 includes a non-vacuum packaged sensor chip. In some implementations, a non-vacuum packaged sensor chip is configured to detect MIR. Optionally, the non-vacuum packaged sensor chip is also configured to detect NIR simultaneously with MIR. The sensor system 401 includes a sensor chip 402 that includes a substrate 304, a sensing element 105, and an absorbing layer 409 that is configured to absorb MIR radiation. As shown in FIG. 4, the sensor chip 402 is implemented on a p-type silicon substrate 304. The sensor chip 402 in FIG. 4 defines a top surface and a bottom surface, which is opposite to the top surface. The sensor chip 402 has a dielectric layer 103 and a conductive layer 106 for electrical routing. Dielectric and conductive layers are described in detail above with regard to FIG. 1 and are therefore not described in further detail with regard to FIG. 4. Additionally, the sensor chip 402 includes a p-type doped sensing element 105 and an n-type region or well (referred to herein as "Nwell") 310, which is lightly doped with n-type material. To ensure proper function, the p-type doped sensing element 105 resides in the Nwell 310. In some implementations, the sensor chip 402 includes a single sensing element 105/Nwell 310. In other implementations, the sensor chip 402 includes a plurality of sensing elements 105/Nwells 310. The resistance of the sensing element 105 is temperature dependent, i.e., resistance changes as a function of temperature. The p-type doped sensing element 105 and the Nwell 310 are formed on the p-type silicon substrate 304 through implant or diffusion.

As discussed above, the sensor chip 402 also includes the absorbing layer 409 that is disposed on an external surface of the sensor chip 402 for IR absorption. Although a single absorbing layer 409 is shown as an example, this disclosure contemplates that the sensor chip 402 can include more than one absorbing layer 409. In FIG. 4, the absorbing layer 409 is disposed on the p-type silicon substrate 304, which is the top surface of the sensor chip 402. IR radiation is absorbed by the absorbing layer 409 and converted into thermal energy, which causes a temperature change in the sensor chip 402. IR radiation can thus be detected using the sensor chip 402 by measuring the resistance of the sensing element 105.

The sensor chip 402 can optionally include one or more electrical connectors 107. Electrical connectors (e.g., solder bumps, metal pillars, etc.) are described in detail above with regard to FIG. 1 and are therefore not described in further detail with regard to FIG. 4. The sensor chip 402 is mounted on a printed circuit board 108 through electrical connectors 107. The printed circuit board 108 serves as the heat sink during operation and heat flux will flow through the electrical connectors 107. The sensor chip 402, the electrical connectors 107 and the printed circuit board 108 together form the sensor system 401. In addition, for the same reason described above with regard to FIG. 1, the sensor chip 402 is good for detecting MIR, and the sensor chip 402 does not require vacuum packaging.

Figure 5:
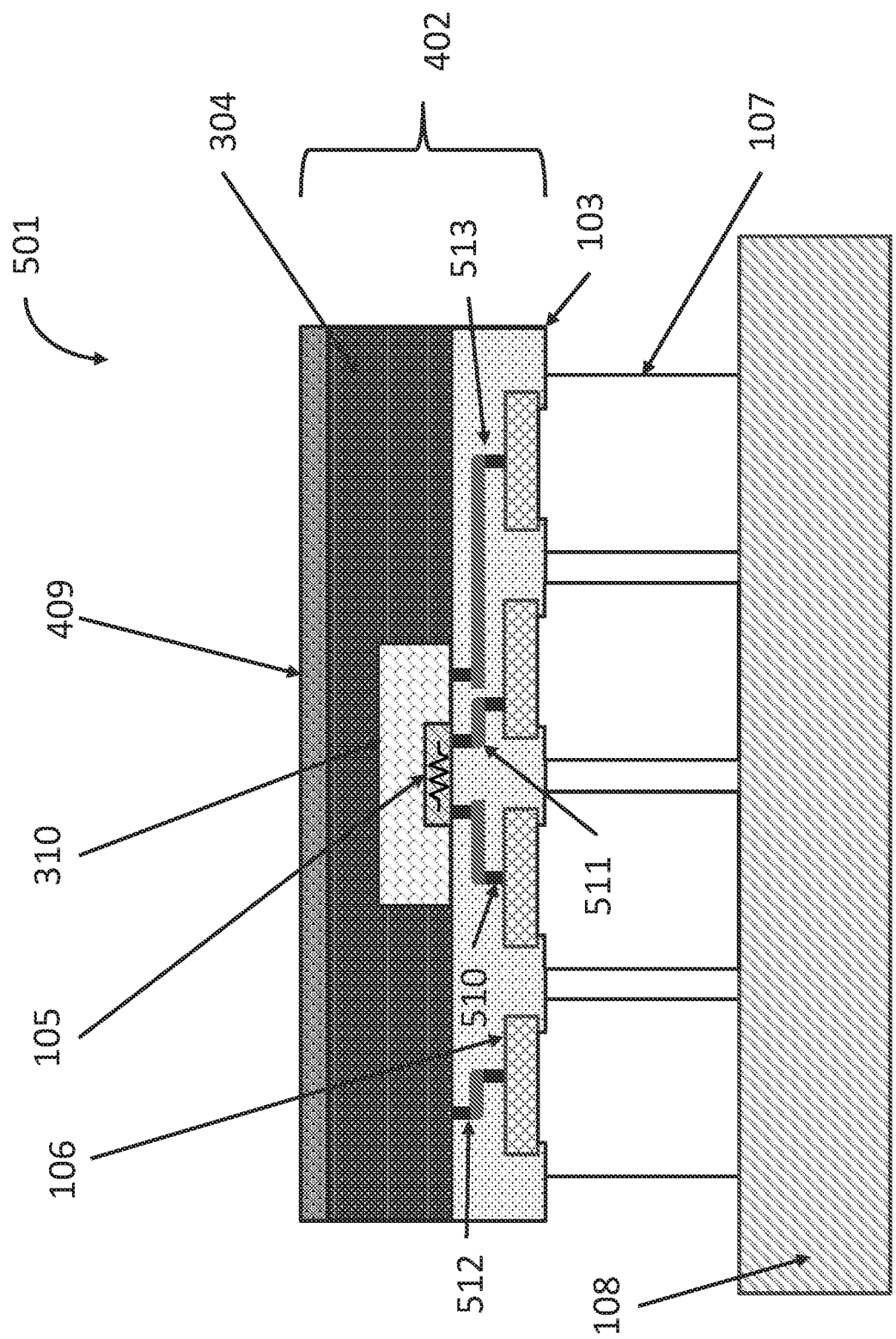
FIG. 5 illustrates the electrical connections for a combined NIR and MIR sensor system of FIG. 4.

FIG. 5 illustrates the electrical connection for the sensor chip 402 shown in FIG. 4. The sensor system 501 is the same as illustrated in FIG. 4 with electrical connections for the sensing element 105 and the Nwell 310. In this implementation, the sensor chip is configured as a combined MIR and NIR sensor. The sensor chip 402 includes positive and negative potential nodes 510 and 511, respectively. The positive potential node 510 and negative potential node 511 are connected to the sensing element 105. This disclosure contemplates that the positive potential node 510 and negative potential node 511 can be made of a conductive material such as metal. The positive potential node 510 and negative potential node 511 are connected between opposite ends of the sensing element 105 and respective conductive layers. Electrical signals can then be routed via the electrical connectors 107. Nodes 510 and 511 are used to measure resistance of the sensing element 105. For example, a measuring current can be passed through the sensing element 105 via nodes 510 and 511 to measure its resistance, which is related to MIR radiation. As described herein, the resistance of the sensing element 105 is temperature dependent, i.e., resistance changes as a function of temperature. As a result of this relationship, it is possible to detect MIR radiation. In FIG. 5, a single sensing element 105 is provided as an example. In implementations with more than one sensing element, it should be understood that positive and negative potential nodes can be provided for each sensing element. The absolute resistance change can be translated into a voltage change during later stage signal processing.

Figure 7:
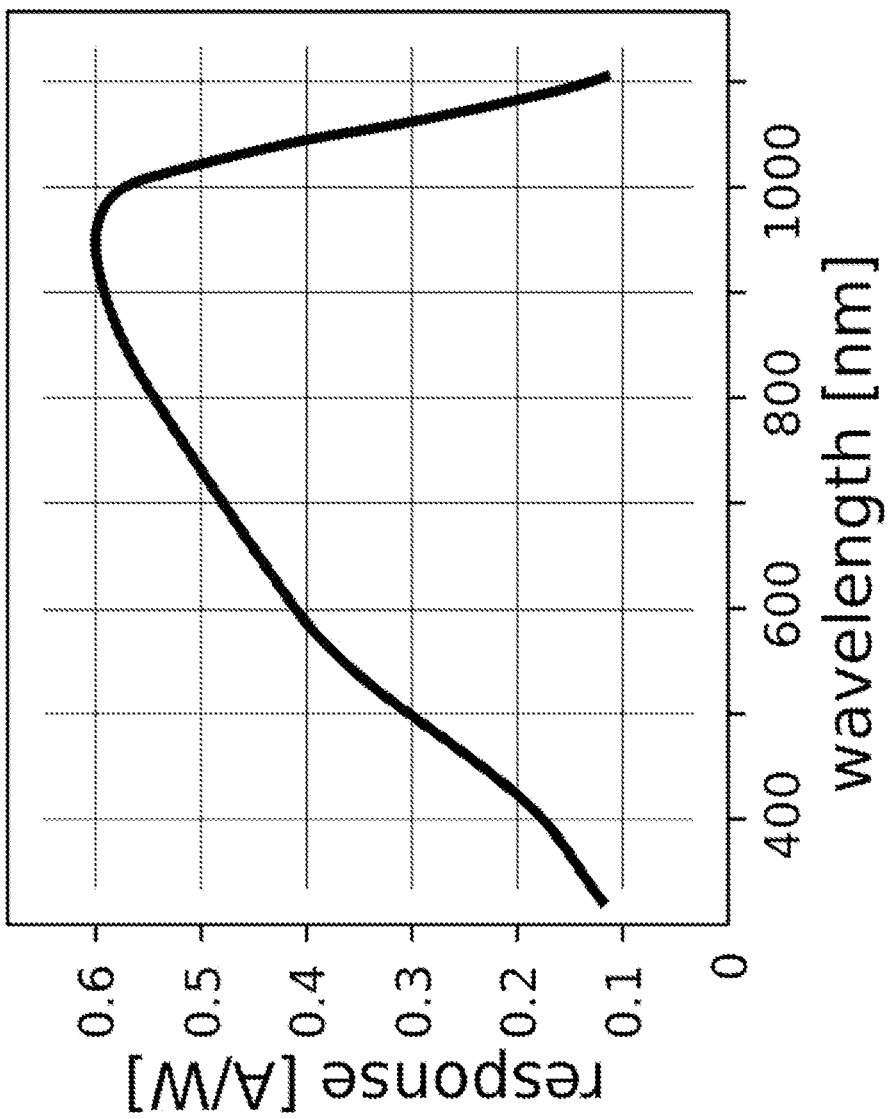
FIG. 7 illustrates the induced photo-current response to incident light of an example sensor chip.

Meanwhile, it should be understood that there is another photo-induced current between the Nwell to p-type substrate junction diode. The photo current is induced by NIR radiation. Such response is known in the art. For example, the induced photo-current response to incident light of an example sensor chip is shown in FIG. 7. As shown in FIG. 7, the maximum induced photo-current is found between 900 nm to 1 µm for the wavelength of incident light (i.e., NIR). Referring again to FIG. 5, the sensor chip 402 also includes positive and negative diode nodes 512 and 513, respectively, which can be used to measure the photo-induced current. This disclosure contemplates that the positive diode node 512 and negative diode node 513 can be made of a conductive material such as metal. As shown in FIG. 5, the positive diode node 512 is connected between the p-type substrate 304 and a conductive layer, and the negative diode node 513 is connected between the Nwell 310 and a conductive layer. Electrical signals can then be routed via the electrical connectors 107. It should be understood that the positive and negative diode node connections shown in FIG. 5 are provided only as an example. This disclosure contemplates using other electrical connection configurations for the positive and negative diode nodes. It should be understood that the current flowing through the sensing element 105 (e.g., measured at nodes 510, 511) is different than the photo-induced current (e.g., measured at nodes 512, 513). Thus, by diverting the junction current of Nwell, the NIR response is separated from MIR. This measuring method ensures there is separation between MIR, which is MIR induced resistance change, and NIR, which is NIR induced diode current. In FIG. 5, a single sensing element 105/Nwell 310 is provided as an example. In implementations with more than one sensing element/Nwell, it should be understood that positive and negative diode nodes can be provided for each Nwell. This disclosure contemplates that the silicon substrate can be replaced with a complementary metal oxide semiconductor ("CMOS") substrate which is also essentially a p-type silicon. In this implementation, the electrical nodes 510, 511, 512 and 513 can be diverted to the CMOS internal nodes rather than through the electrical connectors 107. Electrical connection is illustrated with regard to the sensor chip 402 as an example. It should be understood that similar electrical connection can be provided for the sensor chip shown in FIG. 3.

Figure 6:
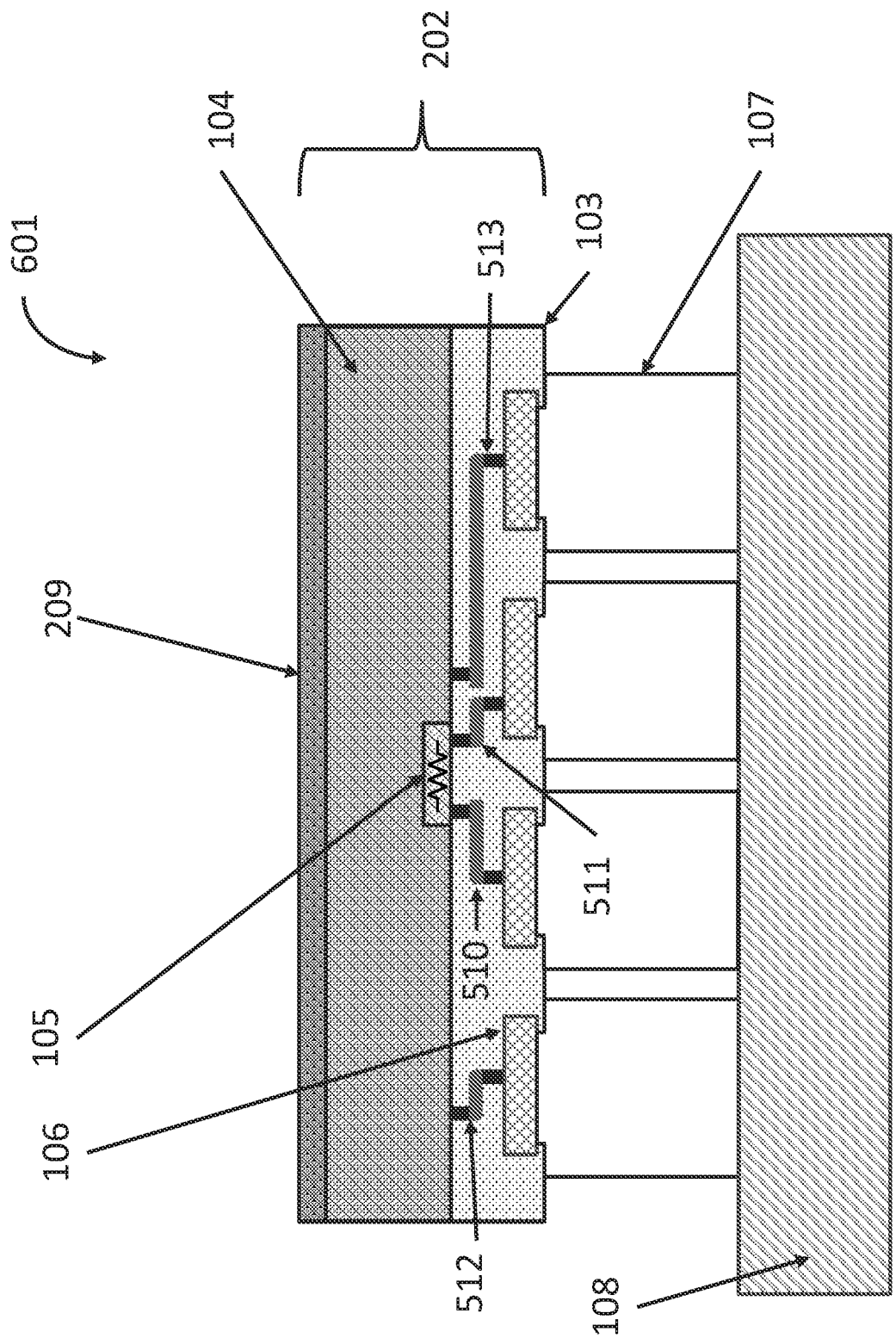
FIG. 6 illustrates the electrical connections for a combined NIR and MIR sensor system of FIG. 2.

FIG. 6 illustrates the electrical connection for the sensor chip 202 shown in FIG. 2. The sensor system 601 is the same as illustrated in FIG. 2 with electrical connections for the sensing element 105 and the n-type silicon substrate 104. In this implementation, the sensor chip is configured as a combined MIR and NIR sensor. The sensor chip 202 includes positive and negative potential nodes 510 and 511, respectively. The positive potential node 510 and negative potential node 511 are connected to the sensing element 105. This disclosure contemplates that the positive potential node 510 and negative potential node 511 can be made of a conductive material such as metal. The positive potential node 510 and negative potential node 511 are connected between opposite ends of the sensing element 105 and respective conductive layers. Electrical signals can then be routed via the electrical connectors 107. Nodes 510 and 511 are used to measure resistance of the sensing element 105. For example, a measuring current can be passed through the sensing element 105 via nodes 510 and 511 to measure its resistance, which is related to MIR radiation. As described herein, the resistance of the sensing element 105 is temperature dependent, i.e., resistance changes as a function of temperature. As a result of this relationship, it is possible to detect MIR radiation. In FIG. 6, a single sensing element 105 is provided as an example. In implementations with more than one sensing element, it should be understood that positive and negative potential nodes can be provided for each sensing element. The absolute resistance change can be translated into a voltage change during later stage signal processing.

Meanwhile, it should be understood that there is another photo-induced current between the n-type silicon substrate 104 to p-type junction diode. The photo current is induced by NIR radiation. As discussed above, such response is known in the art, and the induced photo-current response to incident light of an example sensor chip is shown in FIG. 7. Referring again to FIG. 6, the sensor chip 202 also includes positive and negative diode nodes 512 and 513, respectively, which can be used to measure the photo-induced current. This disclosure contemplates that the positive diode node 512 and negative diode node 513 can be made of a conductive material such as metal. As shown in FIG. 6, the positive diode node 512 and negative diode node 513 are connected between different portions of the n-type substrate 104 and respective conductive layers. Electrical signals can then be routed via the electrical connectors 107. It should be understood that the positive and negative diode node connections shown in FIG. 6 are provided only as an example. This disclosure contemplates using other electrical connection configurations for the positive and negative diode nodes. It should be understood that the current flowing through the sensing element 105 (e.g., measured at nodes 510, 511) is different than the photo-induced current (e.g., measured at nodes 512, 513). Thus, by diverting the junction current, the NIR response is separated from MIR. This measuring method ensures there is separation between MIR, which is MIR induced resistance change, and NIR, which is NIR induced diode current. Electrical connection is illustrated with regard to the sensor chip 202 as an example. It should be understood that similar electrical connection can be provided for the sensor chip shown in FIG. 1.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-vacuum packaged sensor chip, comprising:
a substrate, wherein the substrate defines a top surface and a bottom surface;
a sensing element arranged on the substrate, wherein the sensing element is configured to change resistance with temperature;
an absorbing layer configured to absorb middle infrared ("MIR") radiation; and
a dielectric layer arranged on the bottom surface, wherein the absorbing layer is arranged on the top surface.

2. The non-vacuum packaged sensor chip of claim 1, wherein the sensing element is formed of a p-type semiconductor material.

3. The non-vacuum packaged sensor chip of claim 1, wherein the substrate is an n-type semiconductor substrate.

4. The non-vacuum packaged sensor chip of claim 1, wherein the substrate is a p-type semiconductor substrate having an n-type well, and wherein the sensing element is arranged in the n-type well.

5. The non-vacuum packaged sensor chip of claim 1, wherein the substrate is a CMOS substrate.

6. The non-vacuum packaged sensor chip of claim 1, further comprising a plurality of terminals configured to measure a resistance of the sensing element.

7. The non-vacuum packaged sensor chip of claim 1, further comprising a plurality of photo-current terminals configured to measure a current induced by near infrared ("NIR") radiation.

8. The non-vacuum packaged sensor chip of claim 7, wherein the NIR radiation has a wavelength between about 900 nm and 1 μm.

9. The non-vacuum packaged sensor chip of claim 1, wherein the absorbing layer is configured to absorb a wavelength between about 1 μm and about 20 μm.

10. The non-vacuum packaged sensor chip of claim 1, wherein the absorbing layer is formed of silicon nitride, metal, or polymer.

11. The non-vacuum packaged sensor chip of claim 1, wherein the non-vacuum packaged sensor chip has a chip scale package form factor.

12. The non-vacuum packaged sensor chip of claim 1, wherein the non-vacuum packaged sensor chip is electrically and mechanically coupled to an external circuit substrate via solder bumps or pillars.

13. The sensor system of claim 12, wherein the external circuit substrate is a printed circuit board.

14. A sensor chip, comprising:
   a substrate, wherein the substrate defines a top surface and a bottom surface;
   a sensing element arranged on the substrate, wherein the sensing element is configured to change resistance with temperature;
   an absorbing layer configured to absorb middle infrared ("MIR") radiation;
   a dielectric layer arranged on the bottom surface, wherein the absorbing layer is arranged on the top surface;
   a plurality of terminals configured to measure a resistance of the sensing element; and
   a plurality of photo-current terminals configured to measure a current induced by near infrared ("NIR") radiation.

15. The sensor chip of claim 14, wherein the sensing element is formed of a p-type semiconductor material.

16. The sensor chip of claim 14, wherein the substrate is an n-type semiconductor substrate.

17. The sensor chip of claim 14, wherein the substrate is a p-type semiconductor substrate having an n-type well, and wherein the sensing element is arranged in the n-type well.

18. The sensor chip of claim 14, wherein the substrate is a CMOS substrate.

19. The sensor chip of claim 14, wherein the absorbing layer is configured to absorb a wavelength between about 1 μm and about 20 μm.

20. The sensor chip of claim 14, wherein the NIR radiation has a wavelength between about 900 nm and 1 μm.

21. The sensor chip of claim 14, wherein the absorbing layer is formed of silicon nitride, metal, or polymer.

22. The sensor chip of claim 14, wherein the sensor chip has a chip scale package form factor.

23. The sensor chip of claim 14, wherein the sensor chip is not vacuum packaged.

24. The sensor chip of claim 14, wherein the sensor chip is electrically and mechanically coupled to an external circuit substrate via solder bumps or pillars.

25. The sensor system of claim 24, wherein the external circuit substrate is a printed circuit board.

* * * * *